Nov. 21, 1961     J. J. A. ROBILLARD     3,009,255

HORIZON INDICATING SYSTEM

Filed April 25, 1957     3 Sheets-Sheet 1

INVENTOR
JEAN JULES ACHILLE ROBILLARD

BY Campbell, Brumbaugh
Free and Graves
HIS ATTORNEYS

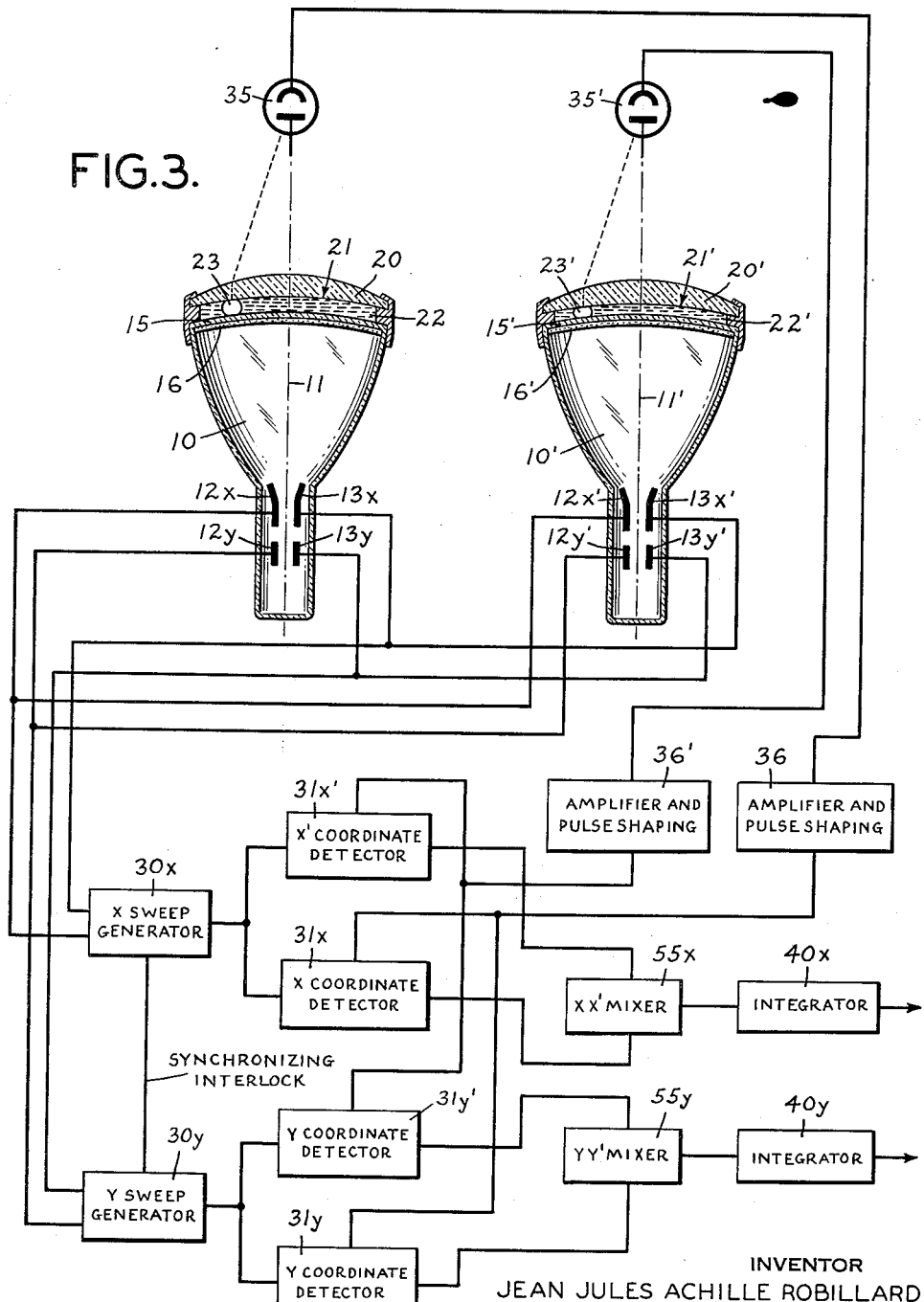

United States Patent Office 3,009,255
Patented Nov. 21, 1961

3,009,255
HORIZON INDICATING SYSTEM
Jean Jules Achille Robillard, Stockholm-Vallingby, Sweden, assignor to Motorola, Inc., Chicago, Ill., a corporation of Illinois
Filed Apr. 25, 1957, Ser. No. 656,178
6 Claims. (Cl. 33—211)

This invention relates generally to horizon indicating systems, and more particularly to a system of this sort wherein the position of a bubble in a fluid is indicative of the horizon, and wherein the bubble position is determined by electronic means.

This application is a continuation-in-part of my application Serial No. 554,541, filed December 21, 1955, now abandoned, entitled "Horizon Indicating System."

While equipments for generating signals indicative of the true horizon are well known to the prior art, these equipments usually employ a gyro as the horizon indicating element. Such equipments are generally disadvantageous, and particularly disadvantageous for use in carrying craft such as airplanes, because of the relatively high weight thereof, the relatively large space required therefor, and the error produced therein as a result of inertial and precessive effects induced in the gyro by acceleration forces resulting from quick changes in direction, angular orientation, or velocity of the carrying craft.

It is accordingly an object of the invention to provide an artificial horizon indicating system of relatively low weight.

Another object of the invention is to provide an artificial horizon indicating system which takes up little space.

A further object of this invention is to provide an artificial horizon indicating system which is relatively free of error caused by acceleration forces.

A still further object of the invention is to provide an artificial horizon indicating system characterized by more than one of the advantages mentioned above.

These and other objects are realized according to the invention by providing container means to confine a body of fluid so that the fluid body assumes a shape of arcuate cross-section within a given plane, and to also confine a bubble within the arcuate cross-section of the fluid. The container means is adapted to be mounted in fixed relation with the frame of the carrying craft so that the said given plane includes a nominal vertical axis for the carrying craft, and so that the arc of the fluid is intersected by this nominal vertical axis. When the nominal vertical axis coincides with the true gravity vertical, the bubble will assume a reference position in the fluid arc at the intersection thereof with the nominal vertical axis. When, on the other hand, the carrying craft tilts in the given plane so that the nominal vertical axis thereof is angularly displaced from the true gravity vertical, the bubble will move from its reference position by a displacement whose value is functionally related to the angle of tilt in the given plane. For example, if the carrying craft undergoes a leftward angular tilt in the given plane, the bubble moves rightward within the fluid arc away from its reference position by a displacement whose value is a measure of the amount of leftward angular tilt of the craft in the given plane.

The position of the bubble within the fluid arc is determined by periodically scanning the arc from end to end in one direction with a scanning beam, and by generating a pulse signal at the instant the position of the scanning beam coincides with the bubble position. This pulse signal is compared with a signal having a characteristic which varies in time as a function of the progress of the scanning beam across the fluid arc. From this comparison of the pulse signal and the signal with a time varying characteristic, there is obtained a signal whose value is indicative of the displacement of the bubble in relation to its reference position. Accordingly, the value of the indicating signal is a measure of the degree of the angular tilt of the plane, and in this view may be used as a horizon indicating signal to, say, position an element which acts as an artificial horizon to visually represent the lie of the true horizon.

For a better understanding of the invention, reference is made to the following description of exemplary embodiments thereof, the description to be taken with the accompanying drawings wherein:

FIG. 3 is a block diagram of another form of horizon indicating system according to the invention.

A convention used in the following description is that counterpart elements are designated by the same numerical designation, but are distinguished by utilizing different suffixes for these numerical designations. It will be understood, accordingly, that, unless the context otherwise requires, any description of an element with a certain numerical designation and suffix shall be taken to apply also to any other element with the same numerical designation but with a different suffix.

Figure 1:
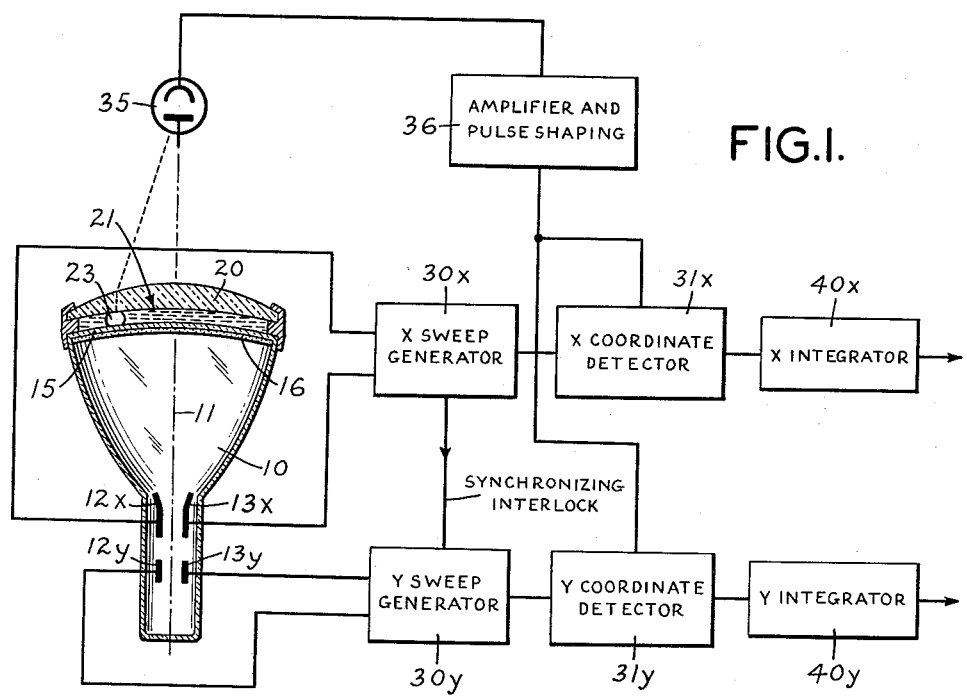
FIG. 1 is a block diagram of one form of horizon indicating system according to the invention.

Referring now to FIG. 1, the number 10 designates a cathode ray tube adapted to be mounted within a carrying craft so that the longitudinal axis 11 of the tube corresponds to the nominal vertical axis or Z coordinate of the craft. It will be understood that this Z coordinate is part of a coordinate system which is referenced to the frame of the craft rather than to the earth, and that, accordingly the orientation of the Z coordinate may change in relation to the earth although it remains fixed in relation to the craft frame. Within the tube a pair of deflecting plates $12x$, $13x$ lie to either side of axis 11 in alignment with the X coordinate for the craft. This X coordinate, which is perpendicular to the Z coordinate, may be, say, the athwartships coordinate for the craft. A similar pair of deflecting plates, $12y$, $13y$ are located within tube 10 to lie on either side of axis 11 in alignment with the Y coordinate of the craft. The Y coordinate is perpendicular to both the Z coordinate and the X coordinate thereof, and is thus the fore and aft coordinate of the craft. While the plates $12y$, $13y$ are actually in 90° displaced relation to the plates $12x$, $13x$, for convenience of illustration the Y deflecting plates are shown in FIG. 1 as in the same plane as the X deflecting plates.

The faceplate 15 of the cathode ray tube has a shape corresponding to a surface of revolution formed by rotating an arc about the axis 11 of tube 10. In the present instance, the rotated arc is a circular arc, so that the inner and outer faces of the faceplate 15 each are in the nature of a spheroidal surface. Deposited on the inner face of faceplate 15 is a thin layer of phosphor material 16 having a very short persistence time.

Above the faceplate 15 there is mounted by conventional support means a concavo-convex lens 20 which covers the entire faceplate. The face plate, the lens and its marginal spacing and sealing means represented in the drawing together form a fluid-tight enclosure. The concave surface 21 of lens 20 faces towards the tube 10, and this concave surface 21 is of such shape that the surface is everywhere spaced the same distance (in the direction of axis 11) away from the top face of faceplate 15. The faceplate 15 and the lens 20 thus define therebetween a space in the form of a spheroidal shell which is everywhere the same thickness in the direction of axis 11. This spheroidal space contains a body of opaque fluid 22 which is present in sufficient amount that the entire space, except for a bubble 23, is filled by the fluid 22. The bubble 23 is sufficiently large that its bottom and top respectively touch the faceplate 15 and the lens 20.

When the Z coordinate of the carrying craft coincides with the true gravity vertical, the bubble 23 will be located within fluid 22 at the point where this body of fluid is intersected by the axis 11. This bubble position is the reference position for the bubble. Any tilt of the carrying craft from the horizontal is registered in the following manner. For any such tilt, the angular displacement of the Z coordinate of the craft can be resolved into two components, namely the angle of displacement from the true vertical of the Z coordinate of the craft in the XZ plane thereof, and the angle of displacement from the true vertical of the Z axis of the craft in the YZ plane thereof. Any such component angular displacement in the XZ plane is indicated by a corresponding displacement from reference position of bubble 23 in the X direction, and any such component angular displacement in the YZ plane is indicated by a corresponding displacement from reference position of bubble 23 in the Y direction. For example, if the craft tilts from the horizon so that there is a leftwardly-directed component of angular displacement in the XZ plane and a rightwardly-directed component of angular displacement in the YZ plane, the bubble 23 will shift from its reference position to a new position, and this new position will be displaced in the X direction to the right of the reference position by an amount of displacement which is proportional to the component of angular displacement in the XZ plane. Also, the new position of the bubble will be displaced in the Y direction to the left of the reference position for the bubble, and the amount of this leftward displacement will be proportional to the component of angular displacement in the YZ plane.

To determine the X direction displacement of bubble 23 from reference position, a sweep generator 30x develops a succession of long-duration saw-tooth scanning signals which are analogous to the vertical scanning signal in television receivers. To determine the Y direction displacement, another sweep generator 30y operates in synchronism with the generator 30x to develop a series of short-duration saw-tooth scanning signals which are analogous to the horizontal scanning signals in a television receiver. The signals from generator 30x are applied both to the deflection plates 12x, 13x and to the input of an X coordinate detector circuit 31x. Similarly, the scanning signals from the generator 30y are applied both to the deflecting plates 12y, 13y and to the input of a Y coordinate detector circuit 31y. Similarly, the scanning signals from the generator 30y are applied both to the deflecting plates 12y, 13y and to the input of a Y coordinate detector circuit 31y.

Within the cathode ray tube 10, the signals respectively applied to the deflecting plates 12x, 13x and to the deflecting plates 12y, 13y produce deflections of the electron beam in the tube in the same manner as an electron beam is deflected in a television receiver. Thus, the electron beam will produce on the phosphor screen 16 a luminescent spot which flies over the screen of the tube in a scanning pattern wherein the spot moves unidirectionally in the Y coordinate in one after another of a series of Y scanning lines spaced closely together in the X coordinate, and wherein the spot progresses unidirectionally in the X coordinate from one Y scanning line to the next in order.

For most of this scanning pattern, the luminescent output of the flying spot is masked by the body of opaque fluid 22. When, however, the flying spot reaches a position directly beneath the bubble 23, the bubble acts as a window to permit a pulse of light from the flying spot to pass beyond the fluid 22. The rays of this light pulse are focused by the lens 20 onto a photocell 35 which responsively generates a negative-going electric signal pulse. This electric signal pulse is fed through suitable amplifier and pulse-shaping circuits represented by the block 36.

Figure 2A:
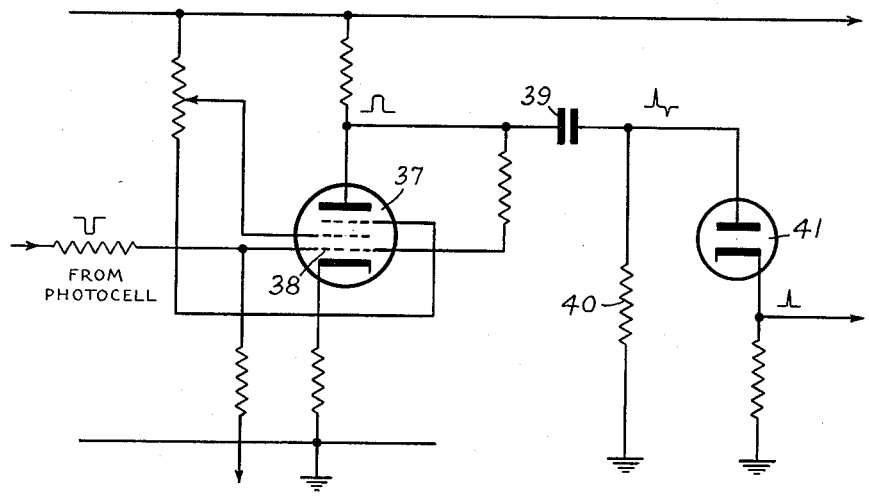
FIGS. 2a and 2b are schematic diagrams showing in detail the circuits in certain of the blocks of FIG. 1.

As shown in FIG. 2a, the circuits of block 36 may comprise a pentode 37 having a grid 38 and connected as a plate-to-grid feedback amplifier as shown in FIG. 2.12 of Waveforms (volume 19 of the M.I.T. Radiation Laboratory Series, published by McGraw-Hill in 1949). The block 36 may also comprise a differentiating circuit, formed of capacitor 39 and resistor 40, and a clipping diode 41. The negative-going input pulse from photocell 35 is amplified and inverted by pentode 37, the differentiating circuit differentiates the leading and lagging edges of the positive pulse output from pentode 37 to produce positive-going and negative-going "spike" pulses respectively corresponding to the leading and lagging edges of the positive pentode output pulse, and the clipper diode 41 eliminates the negative-going "spike" pulse while passing the positive-going "spike" pulse to the output of block 36.

The positive-going pulses passed through block 36 are supplied to both the X coordinate detector circuit 31x and to the Y coordinate detector circuit 31y. Since the circuit 31x and the integrator circuit 40x which follows thereafter are essentially similar, respectively, to the circuit 31y and the integrator circuit 40y which follows thereafter, only the circuits 31x and 40x will be described in detail.

Figure 2B:
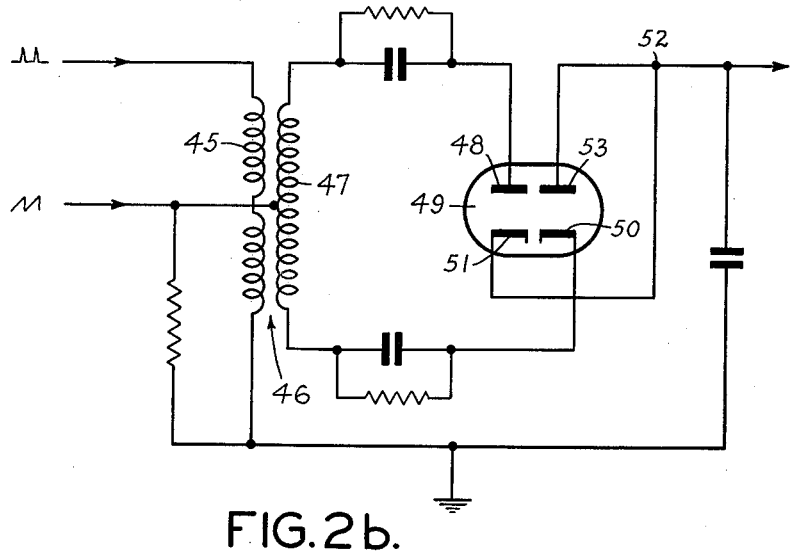

FIG. 2b shows the details of the layout for the X coordinate detector circuit 31x. As shown in this figure, the positive pulses from block 36 are applied to the primary winding 45 of a transforming 46, while the saw-tooth scanning waves from the sweep generator 30x are applied by a center tap to the secondary winding 47 of this transformer. The top end of the secondary winding 47 is connected to the anode 48 of the left-hand section of a double diode 49. The bottom end of winding 47 is connected to the cathode 50 of the right-hand section of this double diode. The cathode 51 of the mentioned left-hand section is connected at an output junction 52 to the anode 53 of the mentioned right-hand section so that the left-hand and right-hand sections of the double diode are connected in series across the secondary winding 47. As set forth in the discussion in Waveforms which relates to FIGS. 3.19 and 3.22 of this text, the circuit of FIG. 2b operates upon receipt of each input pulse from block 36 to produce an output pulse at junction 52 having an amplitude proportional to the instantaneous amplitude of the input sawtooth wave at the time the input pulse is received by the circuit. The instantaneous amplitude of the saw-tooth wave at any given time is a measure of the instantaneous position in the X coordinate at this given time of the flying spot in cathode ray tube 10. Since the time of occurrence of the input pulse from block 36 corresponds to the time of coincidence between the instantaneous position of the flying spot and the position of bubble 23, it will be seen that the amplitude of the output pulse from X coordinate detector circuit 31x will be a measure of the position in the X coordinate of the bubble 23. It will be further evident that the amplitude of this output pulse may be related to some reference amplitude representing the reference position of bubble 23 so that the amplitude of the output pulse is rendered directly proportional to the displacement in the X direction of the bubble from its reference position, and the polarity of the output pulse is rendered indicative of whether the bubble displacement is to the right or to the left of its reference position.

The train of output pulses developed by X coordinate detector 31x are supplied (FIG. 1) to a conventional integrator circuit 40x which in a well-known manner converts this train of output pulses into a continuous signal whose level varies in time in accordance with the time variation in amplitude of the pulses fed to the integrator circuit. The integrator circuit 40y produces a similar continuous signal. The signals from the integrator circuits 40x and 40y are indicative of the lie of the true horizon in both the X coordinate direction and the Y coordinate direction of the carrying craft. Accordingly, these continuous signals may be supplied to an element which under the control of the signals reproduces in a well-known manner the lie of the true horizon plane to thereby furnish a reliable artificial horizon.

It has been assumed heretofore that the bubble 23 responds to tilt from the horizontal of the carrying craft to adjust itself without substantial time lag to a new position. This adjustment of the bubble without substantial time lag does, in fact, take place when the carrying craft has relatively low translational components of acceleration force acting thereon in the X and Y coordinates thereof, and when, also, there is a relatively low rate of angular acceleration for the components of angular tilt which lie in the XZ plane and in the YZ plane of the craft. If, however, one or both of these translational components of acceleration or one or both of these angular components of acceleration is relatively high, the actual position of the bubble during this high acceleration is, because of a time lag in its movement caused by viscosity of the fluid and the like, transiently displaced somewhat from its "stable position," the term "stable position" being defined herein as the position the bubble would have if none of the mentioned components of acceleration were acting on the carrying craft. Since the operation of the FIG. 1 system is based on the assumption that the bubble 23 always occupies its stable position, it will be seen that any displacement between the actual and stable positions of the bubble will result in the introduction of an error factor into the system such that the apparent lie of the horizon indicated by the output signal from the system is in error in respect to the true lie of the true horizon. Thus, any transient displacement between the actual and stable positions of bubble 23 is in the nature of an error displacement.

FIG. 3 shows a horizon indicating system adapted to compensate for this error displacement between the actual and stable positions of the horizon indicating bubble. As shown in FIG. 3, the error compensating system includes all of the components of the FIG. 1 system, and the system also includes the additional components of a tube 10′, photocell 35′, block 36′ of amplifier and pulse shaping circuits, X coordinate detector circuit 31x′, and Y coordinate detector circuit 31y′. Since these last-named components are similar in most respects to the counterpart components already described in connection with the FIG. 1 system, the components just enumerated will not be described in detail except for the features thereof wherein they differ from their counterpart components in the FIG. 1 system.

As shown in FIG. 3, the deflecting plates 12x′, 13x′ are fed with the long-duration saw-tooth scanning waves from sweep generator 30x in the same manner as the plates 12x, 13x of tube 10 are fed by these waves. Also, the plates 12y′, 13y′ of tube 10′ are fed by the short-duration saw-tooth waves of sweep generator 30y in the same manner as the plates 12y, 13y of tube 10 are fed with these signals. Accordingly, the flying spot scanning pattern developed on phosphor screen 16′ of tube 10′ will be the same as the already-described flying spot scanning pattern developed on phosphor screen 16 of tube 10.

The assembly associated with tube 10′ differs from the assembly associated with tube 10 in that the body of fluid 22′ provides a different value of resistance of movement to the bubble 23′ than the value of resistance provided by body of fluid 22 to the movement of bubble 23. This relative difference in values may be obtained, for example, by utilizing fluids 22 and 22′ of the same composition, but by making the thickness of fluid 22 between the lens 20′ and faceplate 15′ different than the thickness of the fluid 22 between lens 20 and faceplate 15. With this difference in structure established between the bodies of fluids 22′ and 22, it can be shown that, in both the X and the Y coordinate of the carrying craft, the component of displacement between the actual and stable positions of bubble 23′ will, at all times, be substantially directly proportional to the component of displacement in the same coordinate of the bubble 23 between its actual and stable positions. This fact enables the stable positions of bubbles 23, 23′ to be determined from the actual positions thereof in the following manner.

Taking the X coordinate as exemplary, let $x$ represent the displacement in this coordinate of the stable position of each of bubbles 23, 23′ from the reference positions thereof, $x_1$ the displacement in this coordinate between the actual and reference positions of bubble 23, $x_2$ the displacement in this coordinate between the actual and reference positions of bubble 23′, and $dx$ the displacement error in this coordinate between the actual and stable positions of bubble 23. From what has been said, it will be evident that the error displacement in this coordinate between the actual and stable positions of bubble 23′ will be represented by the term $kdx$ wherein the term $k$ represents the constant of proportionality which exists between the error displacement of bubble 23 and the error displacement of bubble 23′. The following equations apply:

$$x_1 = x + dx \qquad (1)$$
$$x_2 = x + kdx \qquad (2)$$
$$x_2 = x + k(x_1 - x) \qquad (3)$$
$$x_2 - kx_1 = x - kx \qquad (4)$$
$$x = (kx_1 - x_2)/(k - 1) \qquad (5)$$

Equation 5 demonstrates that the displacement in the X coordinate of the stable position of each of bubbles 23, 23′ from reference position can be determined from the respective actual displacements $x_1$, $x_2$ of these bubbles from reference position, and from the proportionality factor $k$ which relates the error displacements of these bubbles. It follows that a signal indicative of stable bubble position can be obtained by relating in a preselected proportion a pair of electric signals representing the actual displacements of the bubbles 23, 23′ in the X coordinate, by then combining these signals in subtractive relation to obtain a signal representative of the value $(kx_1 - x_2)$, and by adjusting the amplitude of this last-named signal to introduce the denominator factor $(k-1)$. A signal indicative of stable bubble position in the Y coordinate may be obtained in a similar manner.

The actual displacement signal in the X coordinate for bubble 23 is represented by the train of output pulses from X coordinate detector circuit 31x, this train of pulses being obtained in the manner already described for the FIG. 1 system. The actual displacement signal in the X coordinate for the bubble 23′ is represented by a train of output pulses from the X coordinate detector 31x′ which receives a saw-tooth input from the sweep generator 30x and a pulse input from the amplifier and pulse-shaping circuit 36′. The circuit 31x′ is a counterpart in circuit layout and operation of the circuit 31x.

Figure 4:
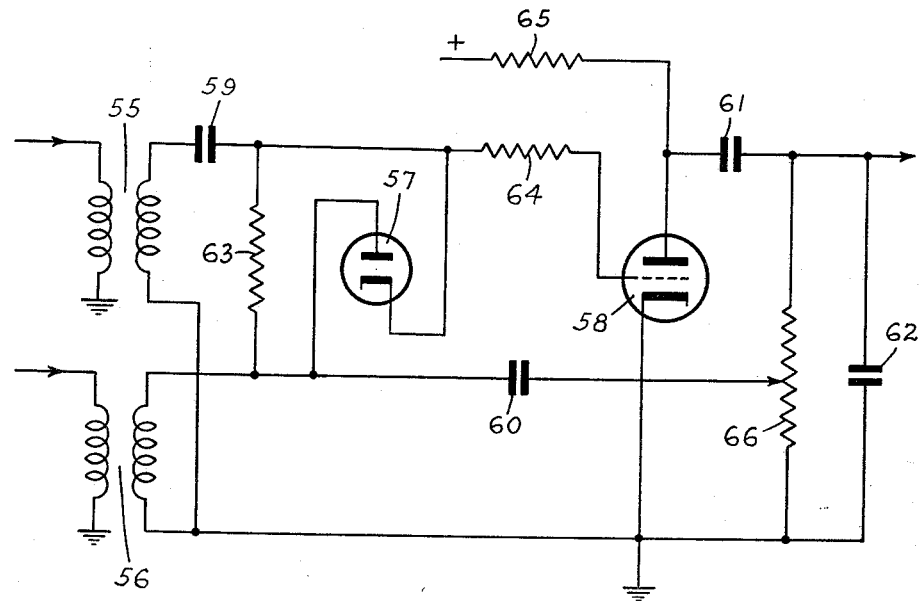
FIG. 4 is a schematic diagram showing in detail the circuits in one of the blocks of the FIG. 3 system.

The pulse train from circuit 31x, representing the actual displacement signal of bubble 23, and the pulse train from circuit 31x′, representing the actual displacement signal of bubble 23′, are both related in the proper proportion described and combined in subtractive relation in the mixer circuit 55x. This circuit is shown in detail in FIG. 4, the circuit being comprised of a pair of input transformers 55, 56, a diode 57, a triode 58, capacitors 59, 60, 61, 62, and resistors 63, 64, 65, 66, all connected as shown in the figure. This circuit is essentially similar to the circuit shown in FIG. 9.15 of the aforementioned Waveforms text. As set forth in this text, the circuit of FIG. 4 is adapted to produce output pulses whose amplitude, in accordance with the considerations discussed above represents the displacement in the X coordinate of stable positions of the bubbles 23, 23' from the reference positions thereof.

In a similar manner, the mixer circuit 55y provides output pulses representative in amplitude of the displacements of the stable positions of bubbles 23, 23' from the reference positions thereof. The respective output pulses from the circuits 55x, 55y are fed to the integrator circuits 40x, 40y to be converted therein (in the manner described in connection with the FIG. 1 system) into continuous signals. These continuous signals may, as before described, be applied to an element which visually indicates the true horizon, or to apparatus as, say, fire control apparatus, which utilizes the horizon information afforded by the continuous signals.

The above-described embodiments being exemplary only, it will be understood that the present invention comprehends embodiments differing in form or detail from the above-described embodiment. For example, embodiments in accordance with the invention may be designed for particular use on board aircraft or, alternatively, may be designed for particular use on board ships. Moreover, embodiments in accordance with the invention are of application even when not carried by moving vehicles. Thus, an instrument the same as or similar to that shown in FIG. 1 may be used to determine the tilt from the vertical of bore holes sunk into the earth. When so used the instrument is lowered into the bore hole while the electronic circuits shown in FIG. 1 may conveniently remain at the surface and be rendered in electrical communication with the instrument by a multi-lead attaching cable. Moreover, while the described embodiments have been stated to be maintained in fixed relation to the object whose tilt is to be determined, it is evident that an instrument in accordance with the invention may be mounted by gimbals or the like to be movable in one or two coordinates with respect to the said object, and that the output signals from the instrument may be used as error signal inputs to a servosystem which restores the instrument to upright position on its gimbals whenever the output signals indicate that the instrument has undergone a tilt. It will be obvious that the invention may be practiced by the use of embodiments wherein the electron beam of the cathode ray tube is deflected radially from the center of the tube and angularly advanced around the tube (plan position indication) rather than being deflected in rectangular coordinates. It will also be obvious that the invention may be practiced by the use of embodiments wherein the fluid body and bubble overlie the face plate of a television camera tube, and wherein radiation passes through the bubble onto the light sensitive screen of the tube to be detected by the scanning electron beam thereof.

Accordingly, the invention herein is not to be considered as limited save as is consonant with the scope of the following claims.

I claim:

1. Apparatus comprising, a cathode ray tube adapted to generate an electron beam and having a face plate which conforms in configuration to an outwardly convex surface of revolution developed about the axis of said tube, a phosphor layer on the inside of said face plate and adapted when excited in a spot by said electron beam to emit radiation from said spot through said face plate, a concavo-convex lens having a concave inner face which matches in configuration with the convex outer face of said face plate, and which is separated therefrom to define therebetween a space in the form of an arcuate shell, said lens having a convex outer face which renders said lens adapted to focus to a common focal point the radiation received thereby, a body of fluid contained in said space and having a movable bubble therein, said fluid being impervious to said radiation from said spot, and said bubble contacting both the outer face of said face plate and the inner face of said lens to provide a window for said radiation through said fluid, and photoelectric means disposed at said focal point to translate into an electric signal the radiation transmitted through said bubble from said spot when said spot is in coincidence therewith.

2. Apparatus comprising, an instrument which is tiltable in respect to the true gravity vertical, a cathode ray tube carried as part of said instrument, said tube being adapted to generate an electron beam and having a face plate which conforms in configuration to an upwardly convex surface of revolution developed about an axis of revolution which is vertical when said instrument is untilted, a phosphor layer on the inside of said face plate and adapted when excited in a spot by said electron beam to emit radiation from said spot through said face plate, a concavo-convex lens having a concave inner face which matches in configuration with the convex outer face of said face plate, and which is separated therefrom to define therebetween a space in the form of an arcuate shell, said lens having a convex outer face which renders said lens adapted to focus to a common focal point the radiation received thereby, a body of fluid contained in said space and having a movable bubble therein which occupies the point of intersection of said axis and of said face plate as a reference position when said instrument is untilted, said fluid being impervious to said radiation from said spot, and said bubble contacting both the outer face of said face plate and the inner face of said lens to provide a window for said radiation through said fluid, photoelectric means disposed at said focal point to translate into an electric signal the radiation transmitted through said bubble from said spot when said spot is in coincidence therewith, a source of a periodic signal characterized by amplitude variations of sawtooth waveform, means to deflect said beam over said phosphor layer in accordance with said variations and in a direction to periodically bring said beam and spot into a position of coincidence with said bubble, and a time comparator circuit conjointly responsive to inputs of each electric signal from said photoelectric means and of the sawtooth variations of said periodic signal to produce an output indicating the instantaneous amplitude of each sawtooth variation at the time of occurrence of the corresponding electric signal, said output being a measure of the displacement of said bubble from reference position.

3. Apparatus comprising, instrument means adapted to be tilted in respect to the true gravity vertical, first and second fluid bodies carried by said instrument means, said bodies in the same coordinate plane having respective cross-sections in the form of fluid arcs, and having first and second bubbles which are respectively movable in said arcs, said fluid arcs providing different resistances to motion therethrough of the bubbles therein, and said fluid arcs being each upwardly convex, when said instrument means is untilted, to be characterized by respective centrally located high points representing reference positions for the bubbles therein, means to provide separate running electrical indications of the actual displacements in said arcs of said first and second bubbles from said reference positions therefor, and electric circuit means conjointly responsive to said two running indications of actual displacement to correct at least one of said indications for the effect of acceleration as a determinant of the instantaneous position of one of said bubbles.

4. Apparatus comprising, instrument means adapted to be tilted in respect to the true gravity vertical, first and second fluid bodies carried by said instrument means, said fluid bodies in the same coordinate direction having respective cross-sections in the form of fluid arcs and having first and second bubbles which are respectively movable in said arcs, said fluid arcs providing different resistances to motion therethrough of the bubbles therein, and said fluid arcs being upwardly convex, when said instrument means is untilted, to be characterized by respective centrally located high points representing reference positions for the bubbles therein, source means of first and second scanning beams, a source of a variable periodic signal, means operable synchronously with the variations of said periodic signal to deflect said first and second beams relative to, respectively, said first and second arcs to bring said beams into respective positions of coincidence with said first and second bubbles, means to detect when coincidence has occurred between first beam and bubble and between second beam and bubble, and to generate first and second electric signals indicating occurrence of the former and latter coincidences, and electric circuit means conjointly responsive to said first and second signals and to said periodic signal to provide an indication, corrected for the effect of acceleration on bubble position, of the displacement of at least one of said bubbles from reference position.

5. Apparatus comprising, instrument means adapted to be tilted in respect to the true gravity vertical, first and second fluid bodies carried by said instrument means, said bodies in the same coordinate direction having respective cross-sections in the form of fluid arcs and having first and second bubbles which are respectively movable in said arcs, said fluid arcs providing different resistances to motion therethrough of the bubbles therein, and said fluid arcs being each upwardly convex, when said instrument means is untilted, to be characterized by respective centrally located high points representing reference positions for the bubbles therein, source means of electron beams directed towards, respectively, said first and second arcs, means to deflect said beams relative to, respectively, said first and second arcs to bring said beams into respective positions of coincidence with said first and second bubbles, means to develop radiation which is transmitted through said first and second bubbles when said bubbles and the beams respectively associated therewith are in coincidence, first and second radiation responsive means to respectively translate the radiations so transmitted through said first and second bubbles into first and second electric signals, and electric circuit means conjointly responsive to said first and second signals to compare said signals and provide an electrical indication, corrected for the effect of acceleration on bubble position, of the displacement of at least one of said bubbles from a reference position.

6. Apparatus comprising, instrument means adapted to be tilted in respect to the true gravity vertical, first and second fluid bodies carried by said instrument means, said bodies in the same coordinate direction having respective cross-sections in the form of fluid arcs and having first and second bubbles which are respectively movable in said arcs, said fluid arcs providing different resistances to motion therethrough of the bubbles therein, and said fluid arcs being each upwardly convex, when said instrument means is untilted, to be characterized by respective centrally located high points representing reference positions for the bubbles therein, said fluids in said arcs and the bubbles therein providing different transmission characteristics through said arcs for radiation respectively impinging thereon, source means of first and second electron beams are directed towards said first and second fluid bodies, a source of a variable periodic signal, means synchronously operable with the variations of said periodic signal to deflect said beams relative to, respectively, the arcs of said first and second bodies to bring said first and second beams into respective positions of coincidence with said first and second bubbles, source means of said radiation, means operable when said first beam and bubble are in coincidence to translate radiation passing from said source means through said first bubble into a first electric signal indicating said coincidence, means operable when said second beam and bubble are in coincidence to translate radiation passing from said source means through said second bubble into a second electric signal indicating the latter coincidence, and electric circuit means conjointly responsive to said first and second signals and to said periodic signal to provide an indication, corrected for the effect of acceleration on bubble position, of the displacement of at least one of said bubbles from reference position.

References Cited in the file of this patent

UNITED STATES PATENTS

| 669,068 | Arthur | Mar. 5, 1901 |
| 1,834,399 | Helmer et al. | Dec. 1, 1931 |
| 2,252,727 | Pepper | Aug. 19, 1941 |
| 2,304,129 | Thurlow | Dec. 8, 1942 |
| 2,393,670 | White | Jan. 29, 1946 |
| 2,427,902 | Clifton et al. | Sept. 23, 1947 |

FOREIGN PATENTS

| 310,539 | Italy | Aug. 3, 1933 |
| 534,694 | Great Britain | Mar. 14, 1941 |